United States Patent Office 3,737,354
Patented June 5, 1973

3,737,354
PRODUCTION OF SYNTHETIC PAPERS
Takeo Hattori, Yokkaichi, Japan, assignor to Mitsubishi Petrochemical Company Limited, Tokyo-to, Japan
Filed Aug. 14, 1970, Ser. No. 63,802
Claims priority, application Japan, Aug. 28, 1969, 44/67,603
Int. Cl. B29c 29/00; B32b 5/14
U.S. Cl. 156—229
4 Claims

ABSTRACT OF THE DISCLOSURE

Along the lateral edges of paper-material layers of a thermoplastic resin containing an inorganic filler and prepared to be bonded laminarly on the two surfaces of a base film of a thermoplastic resin to form a laminated structure, respective edge regions not containing any inorganic substances are formed, whereby when the lateral edge parts of the laminated structure are trimmed off after lateral tentering, the edge parts thus cut off contain almost no inorganic substance and, therefore, can be reclaimed and reused as a starting material for the base film.

CROSS-REFERENCE TO RELATED APPLICATION

Reference is made to copending U.S. patent application Ser. No. 809,629, filed Mar. 21, 1969, entitled "Synthetic Papers and Method of Making the Same" in the name of M. Takashi and M. Yoshiyasu, now abandoned.

BACKGROUND OF THE INVENTION

This invention relates generally to synthetic papers and more particularly to a new and advanced method for producing synthetic papers of laminated structure such as bilaminar and trilaminar paper sheets.

Materials which are generally called "synthetic papers" are in most cases composed of a base material layer and one or two paper-like-material layers disposed in laminated state on the surface of the base material layer and formed by biaxial drawing.

For example, there has previous been proposed a synthetic paper of laminated structure as disclosed in copending U.S. patent application Ser. No. 809,629, filed Mar. 21, 1969, entitled "Synthetic Papers and Method of Making the Same." This previously proposed synthetic paper is of laminated structure comprising a first film of a first thermoplastic resin admixed with from 0 to 20 percent by weight of a fine inorganic filler and a second film of a second thermoplastic resin admixed with from 0.5 to 65 percent by weight of a fine inorganic filler. The film of the second thermoplastic resin is caused to adhere to at least one surface of the first film, which is in a biaxially oriented state, the second film is in a uniaxially oriented state.

There has also been proposed a method of making this synthetic paper which comprises the steps of: laminating a thermoplastic resin admixed with from 0.5 to 65 percent by weight of a fine inorganic filler on at least one surface of a uniaxially oriented film made of a thermoplastic resin previously drawn by at least 1.3 times in its longitudinal direction to obtain a composite structure; drawing this composite structure under heat by at least 2.5 times in a transverse direction perpendicular to the above mentioned longitudinal direction to obtain a laminated structure consisting of one biaxially oriented film and at least one uniaxially oriented film; and cooling this laminated structure while maintaining the oriented state thereof.

In the prior method of forming laminated synthetic papers by drawing in this manner, the longitudinal drawing process presents no problem, but the transverse drawing process is accompanied by numerous problems, particularly the impossibility heretofore of providing a satisfactory method of disposing of the edge part of the undrawn part formed on both lateral sides of a long sheet material. This problem is accompanied by the following several difficulties.

Referring to FIG. 3 of the accompanying drawing described hereinafter, there is shown a cross sectional view of a laminated synthetic paper of known type being subjected to a drawing process, in which paper-material layers 12 (films containing an inorganic filler) laminarly superposed on respective sides of a base film 11 are being drawn in the transverse direction. In this process, each of the lateral edge parts (only one shown and considered) of the base film is pulled as it is clamped by and between clamp jaws 13. Consequently, the laminar part of the central part of the paper is drawn smoothly, but an undrawn part remains in the edge part. Accordingly, the conventional practice is to trim or cut off this undrawn part along a plane 14 to form the final edge.

The cut-off edge part must be reclaimed in order to achieve economical operation. However, since the base film 11 and paper-material layers 12 of this cut-off part cannot be recovered separately, mixing of this cut-off part which has these paper-material layers 12 containing an inorganic filler with the starting materials of the base film 11 would naturally result in an admixing of the inorganic filler into the base film 11 and thereby in the possibility of a lowering of the material quality, particularly the stretch-ability or allowable elongation of the sheet.

In this case, the allowable limit of admixture of an inorganic filler in the base film 11 is of the order of a few percent. When this limit is exceeded, splits tend to occur in the transverse drawing operation, and a stable production cannot be attained. Moreover, the tensile strength and impact strength of the sheet decrease, and the physical properties of the base film 11 undergo a change.

Then, when a material balance is established in accordance with known practice, and the cut-off edge part is reclaimed, the content of the inorganic filler in the base film 11 naturally exceeds the allowable limit of a small number of percent because of the several tens of percent of the inorganic filler in the paper-material layer.

On the other hand, when the edge part thus cut off is mixed with the starting material of the paper material layers 12, the melting index M.I. (which is small in actual practice) of the resin of the base film 11 and the M.I. (which is large in practice) of the paper-material layers 12 differ widely, whereby melting deviations occurs, and a synthetic paper of aesthetically good quality cannot be obtained.

SUMMARY OF THE INVENTION

It is an object of the present invention to provide a method for producing synthetic papers of laminate structure wherein edge parts cut off can be utilised for reclamation of the base-film material.

This object can be achieved in accordance with the invention by forming a region without an admixed inorganic filler along each of the lateral edges of paper-material layers to be laminated with a base film. Then, when each of these regions in laminated combination with the base film is cut off as an edge part after lateral drawing, the quantity of an inorganic filler admixed with the cut-off edge part is extremely small and well within the allowable limit.

The nature, principle, details, and utility of the invention will be more clearly apparent from the following detailed description with respect to a preferred embodiment thereof when read in conjunction with the accompany drawing, in which like parts are designated by like reference numerals.

DETAILED DESCRIPTION

Figure 1:
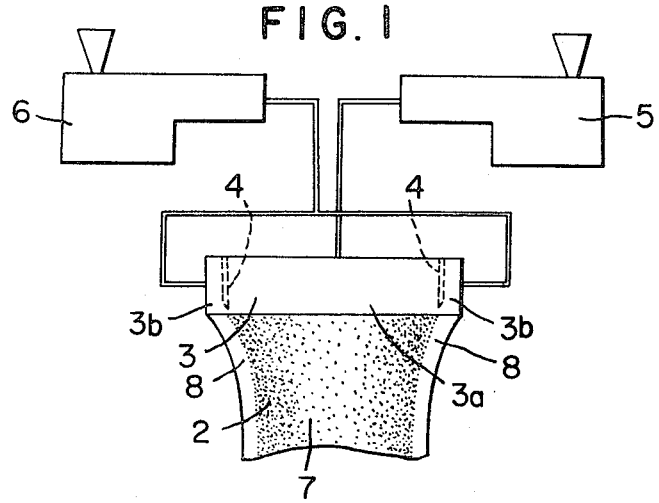
FIG. 1 is a diagrammatic view, partly in section and partly in schematic form, indicating one example of method of fabrication of a sheet with a filler in the production of synthetic papers according to the invention.

Referring to FIG. 1, the apparatus illustrated therein indicates one example of a process in the preparation of a paper-like layer 2 to be laminarly superposed on one surface or both surfaces of a base film. Partition walls 4, 4 are provided on two sides of the nozzle of a T die 3 to divide the T die 3 into a central part 3a and side parts 3b, 3b. The central part 3a is connected to an extruding machine 5 for supplying thereto a thermoplastic resin mixture in which an inorganic filler has been admixed, while the two sides parts 3b, 3b are connected to another extruding machine 6 for supplying thereto only the thermoplastic resin.

As necessary, additives such as pigments for adjustment of hue and colour are admixed with the thermoplastic resin 2 containing the inorganic filler thereby to improve the writability and printability of the product. The quantity of the admixed inorganic filler is from 0.5 to 65 percent by weight.

Thus, the extruding machines 5 and 6 are operated to supply the resin with filler to the central part 3a of the T die 3 and to supply the resin without filler to the side parts 3b of the die, whereby the resin materials are extruded and formed through the die nozzle. Accordingly, it is possible to form a sheet constituting the paper-material layer 2 with lateral side edges wherein resin parts 8 without filler are formed integrally with respect to a resin part 7 with filler.

Separately, a base film 1 which has been formed with a specific thickness as drawn 1.3 times or more in its longitudinal direction. Then, on at least one surface of this base film 1, the paper-material layer 2 prepared in the above described manner is laminarly disposed to form a laminated structure A, which is then drawn 2.5 times or more, as it is heated, by the jaws 9 of a tentering machine thereby to form a synthetic paper.

Figure 2:
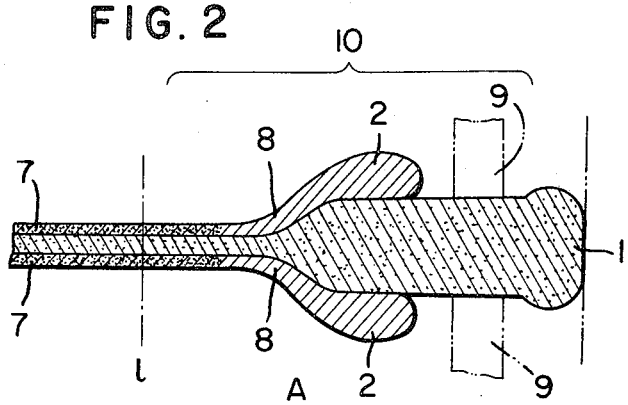
FIG. 2 is an enlarged sectional view showing essential parts in a process of drawing synthetic paper according to the invention which is composed of the same sheet with filler in laminar superposition.
Figure 3:
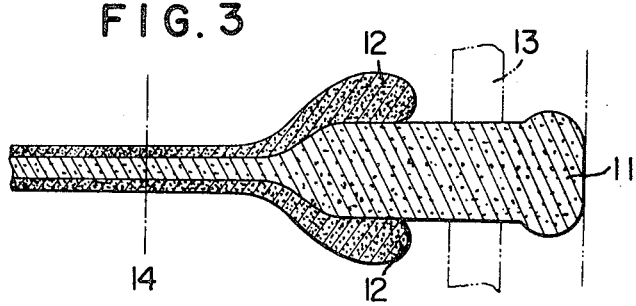
FIG. 3 is an enlarged sectional view showing essential parts in a process of drawing a laminated synthetic paper of known type.

This drawing of the sheet in the transverse direction is accomplished by an elongation in the transverse direction by the jaws 9 clamped on and pulling the two edge parts of the base film 1 as indicated in FIG. 2, and on each lateral side, a cutting line l is provided at the boundary between the resin 8 without filler and resin 7 with filler. The edge region 10 can then be trimmed or cut off along this cutting line l.

Since the edge part 10 thus cut off contains almost no filler admixed therein, it can be reused as a starting material for preparing the base film 1.

Thus, by the practice of the present invention in the production of a synthetic paper as described above, the reclamation for reuse of the cut-off adge part is made possible. Particularly since the two lateral edges of the paper-material layer to be laminated are formed as a resin part not containing inorganic substances, there are almost no inorganic substances admixed in the cut-off edge parts. Accordingly, there is afforded a low-cost method of producing synthetic papers without waste of starting material.

The nature, principle, and details of the prior invention referred to above apply to the present invention. Accordingly:

As the base layer for the synthetic paper according to the present invention by which the advantages mentioned above can be expected, a suitable thermoplastic resin of orientable property can be used. Specifically, polyolefin resins such as homopolymers and copolymers of, for example, ethylene, propylene, and butene-1; polyamide resins; polyester resin such as polyethylene terephthalate; polyvinyl resins such as homopolymers and copolymers of vinyl chloride; and polyvinylidene resins such as homopolymers and copolymers of vinylidene chloride, and homopolymers and copolymers styrene can be used singly or as a mixture therewith. Further, auxiliary materials such as a stabilizer, plasticizer, filler, and pigment may be contained in the base material resin within its drawable range as necessary. In this case, when less than 20% by weight of a filler is blended into the base material resin, some favorable results can be obtained. That is, whiteness or opacity, stiffness, and toughness of the resulting synthetic paper can be improved, and since the surface of the base layer becomes coarse, adhesion of the base layer with the paper-like layers becomes more tenacious.

An orientable thermoplastic resin used for the paper-like layer may be the same or a different resin selected from the group consisting of the above mentioned resins for the base layer. In the case in which the softening point of the paper-like layer resin is less than that of the base layer resin (for instance, in the case in which the base layer is made of a homopolymer, and the paper-like layer is made of a copolymer containing a monomer which is a component unit of the above homopolymer, most of the resulting paper-like layers have lower softening points than those of the respective base layers) a favourable heat sealing can be carried out free from shrinkage of the base layer. In this case, for the resin of paper-like layer, a resin having a sufficient adhesiveness with respect to the above-mentioned base layer for lamination should be selected. The resin for paper-like layer may also contain a suitable auxiliary material similarly as in the case of the base layer resin.

The paper-like layer resin contains a fine inorganic filler, but a filler which is caused to lose its function or is subject to discolouration by the decomposition of the filler at a temperature which may be applied in the course of making the synthetic paper is undesirable for this invention. Examples of suitable inorganic fillers for the paper-like layer are clay, talc, asbestos, gypsum, barium sulfate, calcium carbonate, magnesium carbonate, titanium oxide, zinc oxide, magnesium oxide, diatomaceous earth, and silicon oxide used singly or as a mixture of two or more thereof. In this case, it is necessary that the filler should be sufficiently fine (for example, of a grain size approximately 0.5–30 microns). The paper-like layer contains 0.5–65%, preferably 5–60%, by weight, of the fine filler.

As a result of the addition of the inorganic filler, whiteness, stiffness, and toughness of the paper-like layer are improved. Furthermore, by using a fine inorganic filler which generates voids in the paper-like layer when the layer mixed with the fine inorganic filler is subjected to uniaxial drawing in the process of making the synthetic paper, the printability, whiteness and feeling of the paper-like layer thereof can be further intensified because of the generation of voids. If required, the above mentioned fine inorganic filler may be employed in admixed state with a pigment or organic fillers such as vegetable fibres.

In the present invention, first of all, the resin for the base layer mentioned above is formed into a film by a process such as calendering or extrusion molding, whereby the formed film is subjected to uniaxial drawing, and the resin for the paper-like layer mixed with fine inorganic filler is laminated on at least one surface of the film by calendering or melt extrusion laminating. In this case, the film of base layer is drawn by at least 1.3 times in the longitudinal direction thereof, and the calendering or melt extrusion laminating is carried out in accordance with a known method. It is also possible to apply an anchor coat which is adopted in such a melt extrusion lamination as mentioned above on the base film.

Next, the resulting composite structure, that is, the lamination layer consisting of the uniaxially oriented base film and the substantially non-oriented paper-like film is subjected to hot drawing by at least 2.5 times in the transverse direction of the lamination layer in accordance with a conventional method. This drawing assures a firm adhesion of the paper-like layer with the base layer, and, simultaneously, the thicknesses of both layers can be made very thin. After the drawing, the synthetic paper according to this invention is obtained by cooling the two layers and fixing the oriented state thereof while substantially maintaining this state.

The surface features of the synthetic paper thus obtained, if necessary, can be modified by a suitable surface treatment.

I claim:

1. In a method for producing synthetic papers comprising laminating a paper-like material layer comprising a mixture of a thermoplastic resin and an inorganic filler of a particle size of 0.5 to 30 microns in a concentration in the mixture of 0.5 to 65% by weight on at least one surface of the base film of a thermoplastic resin previously drawn in a longitudinal direction thereof to form a laminated structure, drawing said structure in a heated state in the transverse direction perpendicular to said longitudinal direction, cooling the structure while maintaining the same in an oriented state, and severing marginal portions along the two edges of the structure in the longitudinal direction, the improvement which comprises, prior to severing said marginal edge portions and when said layer is being laminated on said base film, developing marginal edge portions on the longitudinal edges of said paper-like material layer and integrally joined with said edges of said layer and substantially free of inorganic filler.

2. In the method according to claim 1, in which prior to laminating said paper-like material layer on said base film extruding said mixture of a thermoplastic resin and an inorganic filler through a central part of a film-forming die, and simultaneously and confluently extruding a thermoplastic resin substantially free of inorganic filler through outer end portions of said die thereby to form said marginal edge portions integral with said mixture extruded through the central part of the die.

3. A process for producing synthetic papers which comprises, providing a film of a thermoplastic resin selected from the group consisting of homopolymers and copolymers of a monomer selected from the group consisting of ethylene, propylene, butene-1, and mixtures thereof, said film being previously drawn in a longitudinal direction; extruding through a film-forming die onto both major surfaces of said film a melt of a mixture of a thermoplastic resin selected from the group consisting of homopolymers and copolymers of a monomer selected from the group consisting of ethylene, propylene, butene-1, and mixtures thereof and a fine inorganic filler of a particle size of 0.5 to 30 microns in a concentration in the mixture of 0.5 to 65% by weight through the central part of said die; while extruding said mixture simultaneously extruding through outer ends of said die a melt of a thermoplastic resin substantially free of fine inorganic filler and selected from the group consisting of homopolymers and copolymers of a monomer selected from the group consisting of ethylene, propylene, butene-1 and mixtures thereof to form integral marginal edge portions on the extrudate through said film-forming die, thereby to produce a laminated structure; drawing said structure under heat in a transverse direction perpendicular to said longitudinal direction; cooling the structure while maintaining same in an oriented state; and cutting off the marginal edge portions along the two edges of the structure in the longitudinal direction, and said marginal edge portions comprising the thermoplastic resin substantially free of fine inorganic filler.

4. A method of manufacturing synthetic paper comprising laminating a layer of a mixture of thermoplastic resin and inorganic filler on a base layer of resinous material, to form a laminated structure, said inorganic filler having a particle size of 0.5 to 30 microns and a concentration in the mixture of 0.5 to 65% by weight, while laminating said layer on said base layer simultaneously extruding a resinous material free of filler as marginal edge portions on opposite edges of said structure integrally joined with said structure to provide an area for gripping said structure to stretch it in a direction normal to said marginal edge portions, stretching said laminar structure, and subsequently severing the marginal edge portions from said structure.

References Cited

UNITED STATES PATENTS

| | | | |
|---|---|---|---|
| 3,503,842 | 3/1970 | Kahn | 161—162 |
| 3,515,626 | 6/1970 | Duffield | 156—244 X |
| 3,551,242 | 12/1970 | Boeke | 156—244 |
| 3,154,461 | 10/1964 | Johnson | 161—116 |

RALPH HUSACK, Primary Examiner

U.S. Cl. X.R.

117—4, 7, 68, 138.8 E; 156—163, 244, 267; 161—147